April 7, 1936.  E. DE L. SALAZAR  2,036,302
ANIMAL BUILDING BLOCK
Filed Aug. 4, 1934
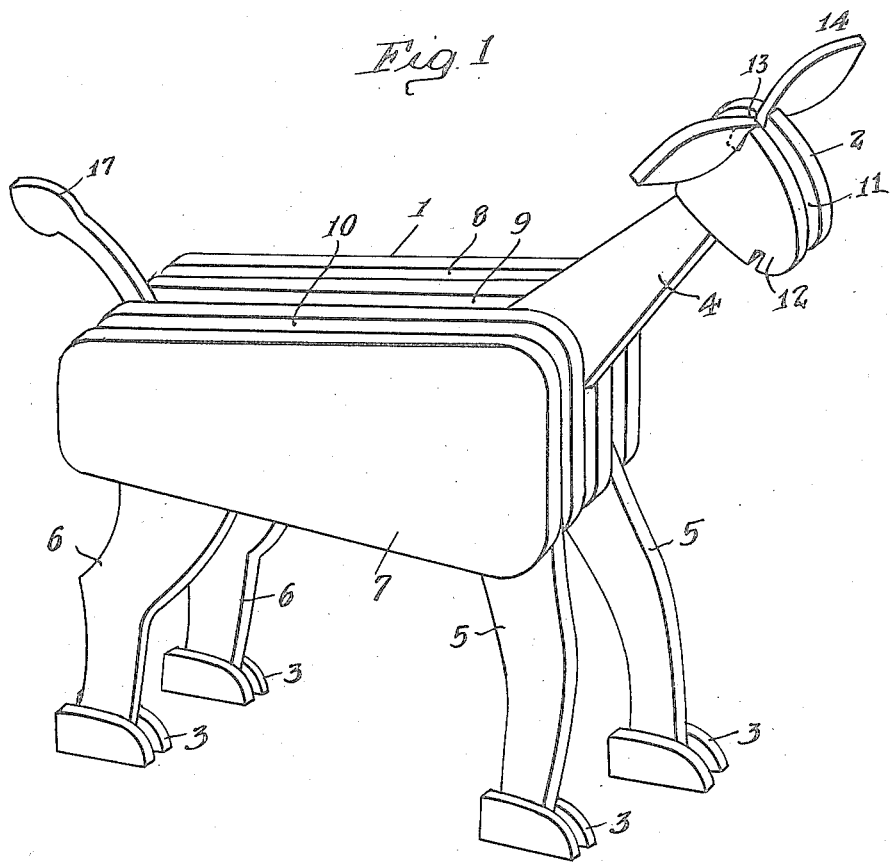
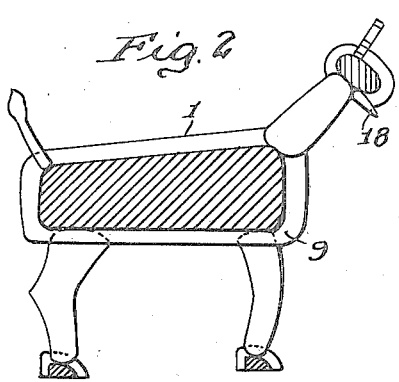
Inventor
Eduardo De Leon Salazar
By Lyon+Lyon
Attorneys Patented Apr. 7, 1936

2,036,302

UNITED STATES PATENT OFFICE 2,036,302

ANIMAL BUILDING BLOCK

Eduardo de Leon Salazar, Los Angeles, Calif.

Application August 4, 1934, Serial No. 738,462

5 Claims. (Cl. 46—22)

My invention relates to animal building blocks, and has particular reference to blocks, or block sets, in which various blocks and associated pieces may be assembled together to make different forms and figures, simulating types of animals, birds, and the like.

In building blocks it is the usual practice to provide a series of differently shaped blocks having formed thereon interconnecting members by which such blocks may be connected to other blocks to construct the various figures or forms which it is desired to build. To adapt such blocks to the building of animals, birds, and similar figures, various expedients have been resorted to to permit the connection of legs, arms, heads and other parts of the animals, all of which have been characterized by the fact that the attachments are made at fixed points thereby reducing the number of different figures which may be constructed with any set, and further requiring that each figure constructed shall follow exactly predetermined forms necessitated by the fixed positions of the attaching members.

It is, therefore, an object of my invention to provide an animal block set in which the various parts of the animals to be assembled may be attached at any points, permitting the construction of a greater number of different figures and to produce the figures in different positions impossible with previous sets.

Another object of the invention is to provide a set of animal blocks which consists of one or more body members having continuous attaching means for securing other parts thereto so that such other parts may be secured to the body at any point around the periphery of the body.

Another object of the invention is to provide an animal building block, as set forth in the preceding paragraph, in which the block is provided with a plurality of continuous attaching means spaced across the body members so that the arms, legs, heads, and the like, may be attached to the body members in spaced relation to provide a stable figure which will be self-supporting.

Other objects and advantages will be apparent from a study of the following specifications, read in connection with the accompanying drawing, wherein Figure 1 is a perspective view of an animal formed from blocks and constructed in accordance with my invention;

Figure 2 is a vertical sectional view through the animal figure shown in Fig. 1;

Figure 3 is a detail view of one form of attachment block which may be employed with my invention; and Fig. 4 is a perspective view of a slightly different form of attachment block which may be employed with my invention.

Referring to the drawing, I have illustrated in Fig. 1 an animal figure formed from a body member 1, a head member 2, foot members 3, which members are secured together to simulate or represent animal figures by means of attachment members, such as a neck 4, which connects the head 2 to the body 1, and leg members 5 and 6 which may be employed to connect the body and foot members.

By referring particularly to Figures 1 and 2, it will be observed that the body member 1 comprises a block of appreciable thickness, the contour or outline of the face 7 of the block being made in the form of any desired geometrical figure. The edge of the block is traversed by a plurality of grooves 8, 9 and 10, each of which extends in parallel relation to the face of the block and extends continuously throughout the periphery of the block. I prefer to provide three of such grooves 8, 9 and 10, spaced at equal intervals across the body member 1, so that the two outermost grooves 8 and 10 may be employed for the reception therein of the leg members 5 and 6.

As will be understood from an inspection of Fig. 1, four leg members may be employed, two inserted in the groove 8 and the other two inserted in the groove 10, so that the figure may rest upon the legs, which, being in spaced relation as shown in the drawing, will constitute a suitable support for the figure, holding the same upright upon any suitable surface upon which it may be placed.

The intermediate groove 9 is preferably used as an attaching means to which the neck 4 may be secured so that as in life the neck of the animal will be disposed in a plane between the plane of attachment of the legs 5 and 6.

It will be understood from the foregoing that with the construction thus far described the legs 5 and 6 may be secured to the body member 1 at any position throughout the periphery of the body member so that the body member, if rectangular or elongated, may be mounted upon the legs with its major axis either horizontal, vertical, or disposed at any desirable angle, while also the neck 4 may be secured to the body member 1 at any point throughout the periphery of the body, thus permitting the construction with a single body member of a number of grotesque and amusing figures by the mere changing of position of the body member and the attachments which are secured thereto.

The grooves 8, 9 and 10 are preferably formed with straight side walls so that the attachments 4, 5 and 6 may be constructed in the form of thin strips of wood or suitable material, having their opposite faces in parallel relation, and having a thickness equal to, or slightly in excess of, the width of the grooves 8, 9 and 10. Thus the mere insertion of one end of the attachment members in the grooved body member will suffice to secure the body and attachment members together.

The figure may be made more stable by providing foot members 3 constructed as illustrated herein of small blocks having a single groove extending substantially throughout the periphery of the block to receive therein the ends of the attachment members 5 and 6 opposite to their point of attachment to the body member, and, as will be understood by those skilled in the art, these foot members may be secured to the leg members in any number of grotesque positions, or may be secured with all of the lower surfaces of the foot members in a common plane to assist in stabiliizing the figure.

Another feature of the animal blocks constructed in accordance with my invention, lies in the formation of the head member 2 which, like the body member 1, may be made of any desired geometrical configuration, having a groove 11 extending throughout the periphery of the head 2 in parallel relation with the face 12 of the block forming the head member. Thus the head member may be attached to the neck member 4 at any position throughout the periphery of the head member 2, thus permitting the assembly of the neck and head in any number of grotesque and amusing positions.

The head member is preferably provided with one or more lateral grooves 13 extending at right angles to the face 12, to represent a mouth, or to which may be attached decorative attachments, such as ears 14, horns 15, as shown in Fig. 3, horns 16 as shown in Fig. 4, or any one of a great number of attachment members constructed in the form of appendages of animals. Again, since the attachment or assembly of the appendages depends merely upon the insertion of the appendages in the lateral grooves 13, they may be disposed at any desired angle to assume amusing positions.

Other appendages, such as tails 17 and tongues 18, may be provided to assist in the completion or decoration of the finished animals.

It will therefore be observed that I have provided an animal building block in which a relatively small number of pieces may be employed in the construction of a relatively large number of different figures by assembling the attachment members at various positions and at various angles throughout the periphery of the body and head members, and that by providing the body members with a plurality of parallel spaced grooves the attachment members, such as legs, may be so spaced upon the body member that the finished figure or animal will be self-supporting.

While I have shown and described the preferred embodiment of my invention, I do not wish to be limited to any of the details of construction shown herein, except as defined in the appended claims.

I claim:

1. In an animal building set, a body member having three spaced grooves formed in the edge thereof, each of said grooves extending throughout the periphery of said body member and substantially parallel to the surface of said body member, a plurality of leg attachment members insertable in the outermost grooves at any point throughout the periphery of said body member and maintained in said grooves by friction alone, a head member representing an animal head and a neck member for securing said head member to said body member by insertion of said neck member in said intermediate groove.

2. In an animal building set, a body member having three spaced grooves formed in the edge thereof, each of said grooves extending throughout the periphery of said body member and substantially parallel to the surface of said body member, a plurality of leg attachment members insertable in the outermost grooves at any point throughout the periphery of said body member and maintained in said grooves by friction alone, a head member representing an animal head, and a neck member for securing said head member to said body member by insertion of said neck member in said intermediate groove, said head member having a groove formed in the edge of said head member and extending throughout the periphery of said head member whereby said head member may be attached to said neck member in any one of a plurality of positions.

3. In an animal building set, a body member having three spaced grooves formed in the edge thereof, each of said grooves extending throughout the periphery of said body member and substantially parallel to the surface of said body member, a plurality of leg attachment members insertable in the outermost grooves at any point throughout the periphery of said body member, and maintained in said grooves by friction alone, a head member representing an animal head and a neck member for securing said head member to said body member by insertion of said neck member in said intermediate groove, said head member being provided with a groove extending throughout the periphery of the edge of said head member for receiving the end of said neck member in any position throughout the periphery of said head member, and having a lateral groove extending at right angles to the first named groove to receive other members therein.

4. In an animal building set, a body member having three spaced parallel grooves formed in the edge thereof, each of said grooves extending throughout the periphery of said body member and substantially parallel to the surface of said body member, a plurality of leg attachment members having a thickness substantially equal to the width of each of the outermost grooves, insertable in the outermost grooves at any point throughout the periphery of said body member and maintained in said grooves by friction alone, whereby said body member may be supported upon said leg members at a plurality of points to form a suitable support therefor, a head member representing an animal head, and a neck member having a thickness substantially equal to the width of said intermediate groove receivable in said intermediate groove to support said head member in a plane intermediate the plane of attachment of said leg members.

5. In an animal building set, a body member having parallel opposed faces, and having three spaced peripheral grooves formed in the edge of said body member and extending throughout the periphery of said body member in three spaced planes parallel to the surfaces of said body member, leg members having a thickness substantially equal to the width of the outermost grooves insertable in said outermost grooves to form supporting legs for said body member and spaced laterally thereof to constitute a suitable support for said body member and maintained in said grooves by friction alone, a head member having a neck member for attaching the same to said body member, said neck member having a width substantially equal to the width of the intermediate groove and insertable therein to support said head member in a plane disposed between the planes of attachment of said leg members.

EDUARDO DE LEON SALAZAR.